(12) United States Patent
Xu et al.

(10) Patent No.: US 7,859,131 B2  
(45) Date of Patent: Dec. 28, 2010

(54) SAMPLE AND HOLD SCHEME FOR A FEEDBACK NETWORK OF A POWER CONVERTER

(75) Inventors: Jingwei Xu, Shanghai (CN); Xianwei Zeng, Shanghai (CN)

(73) Assignee: Texas Instruments Incorporated, Dallas, TX (US)

( * ) Notice: Subject to any disclaimer, the term of this patent is extended or adjusted under 35 U.S.C. 154(b) by 239 days.

(21) Appl. No.: 12/133,943

(22) Filed: Jun. 5, 2008

(65) Prior Publication Data

US 2008/0297128 A1 Dec. 4, 2008

Related U.S. Application Data

(63) Continuation of application No. PCT/CN2007/001749, filed on May 31, 2007.

(51) Int. Cl.  
*H02J 1/00* (2006.01)

(52) U.S. Cl. ....................................................... 307/11
(58) Field of Classification Search ................... 307/11  
See application file for complete search history.

(56) References Cited

U.S. PATENT DOCUMENTS 5,917,363 A * 6/1999 Jandu et al. ................. 327/415  
7,443,150 B2 * 10/2008 Schiff ......................... 323/282  
2006/0022728 A1 2/2006 Jaussi et al.  
2006/0033482 A1 * 2/2006 Florence et al. ............. 323/267

FOREIGN PATENT DOCUMENTS

CN 2340117 Y 9/1999

* cited by examiner

*Primary Examiner*—Robert L. Deberadinis  
(74) *Attorney, Agent, or Firm*—William B. Kempler; Wade J. Brady, III; Frederick J. Telecky, Jr.

(57) ABSTRACT

One embodiment of the invention includes a system for regulating an output voltage of a power converter. The system comprises an error amplifier that compares a feedback voltage associated with the output voltage with a reference voltage to generate an error signal that is employed to control a magnitude of the output voltage. The system also comprises a plurality of sample and hold circuits each configured to sample an error amplifier output voltage to provide the error signal. The system further comprises a switching controller configured to control switching of the error amplifier output voltage between each of the plurality of sample and hold circuits in response to a change in an output load of the power converter.

17 Claims, 3 Drawing Sheets

US 7,859,131 B2

SAMPLE AND HOLD SCHEME FOR A FEEDBACK NETWORK OF A POWER CONVERTER

This is a continuation of PCT Application No. PCT/CN2007/001749, filed 31 May 2007, the entirety of which is incorporated herein by reference.

TECHNICAL FIELD

This invention relates to electronic circuits, and more specifically to a sample and hold scheme for a feedback network of a power converter.

BACKGROUND

There is an ever increasing demand for portable electronic devices to operate with increased efficiency and reduced power to accommodate the continuous reduction in size. Many times these devices are battery powered, and it is desirable to utilize as little power as possible to operate these devices so that the battery life is extended. Switching regulators have been implemented as an efficient mechanism for providing a regulated output in power supplies. One such type of regulator is known as a switching regulator or switching power supply, which controls the flow of power to a load by controlling the on and off duty-cycle of one or more high-side switches coupled to the load. Many different classes of switching power supplies exist today.

Some switching power supplies are configured to provide power to a variable or switched load. As an example, to control the brightness of LED strings, current provided from a switching power supply, such as a boost switching power supply, to the LED strings may be repeatedly interrupted. As a result, the changing output load may cause an output ripple condition of the switching power supply. An output ripple condition can be the result of a load current of the output rapidly changing, such that a feedback network is unable to respond to rapidly changing load conditions based on a limited feedback bandwidth. Therefore, the output ripple condition can result in an unstable output voltage, and can provide an undesirable audible humming noise.

SUMMARY

One embodiment of the invention includes a system for regulating an output voltage of a power converter. The system comprises an error amplifier that compares a feedback voltage associated with the output voltage with a reference voltage to generate an error signal that is employed to control a magnitude of the output voltage. The system also comprises a plurality of sample and hold circuits each configured to sample an error amplifier output voltage to provide the error signal. The system further comprises a switching controller configured to control switching of the error amplifier output voltage between each of the plurality of sample and hold circuits in response to a change in an output load of the power converter.

Another embodiment of the invention includes a method for regulating power to a plurality of output loads. The method comprises generating an output voltage from a power converter based on a feedback voltage associated with an error amplifier. The method also comprises sequentially switching the output voltage between each of the plurality of output loads. The method further comprises sequentially switching an error amplifier output voltage between a plurality of corresponding sample and hold circuits concurrently with each switching of the output voltage.

Another embodiment of the invention includes a system for regulating an output voltage of a power converter. The system comprises means for generating an output voltage. The system also comprises means for adjusting the output voltage based on an error voltage. The system also comprises means for switching between an on-state that provides the output voltage to an output load and an off-state that disconnects the output voltage from the output load. The system also comprises a first means for sampling and providing the error voltage to the means for adjusting during the on-state. The system further comprises a second means for sampling and providing the error voltage to the means for adjusting during the off-state.

DETAILED DESCRIPTION

The invention relates to electronic circuits, and more specifically to a sample and hold scheme for a feedback network of a power converter. A plurality of enable signals are configured to control two sets of switches. The first set of switches is configured to sequentially switch the output voltage of a power converter to each of a plurality of output loads, such as light-emitting diode (LED) strings. The second set of switches is configured to sequentially switch a respective plurality of capacitor sample and hold circuits to a feedback input of an error amplifier in a feedback network of the power converter. Each of the plurality of capacitor sample and hold circuits can correspond to one of the output loads. As a result, the capacitor that is switched to the feedback input can sample and hold a feedback voltage while the output voltage is provided to the respective output load. As such, the feedback input can be provided the specific error amplifier output voltage of the respective output load upon the respective output load being switched to the output voltage, such that the output load can be automatically provided with the appropriate output voltage, regardless of the limited bandwidth of the sample and hold circuit. In addition, at times between the coupling of the output voltage to one of the output loads, an off-state capacitor can be switched to the feedback input. Accordingly, the output voltage can remain stable, regardless of the switching of the output loads.

Figure 1:
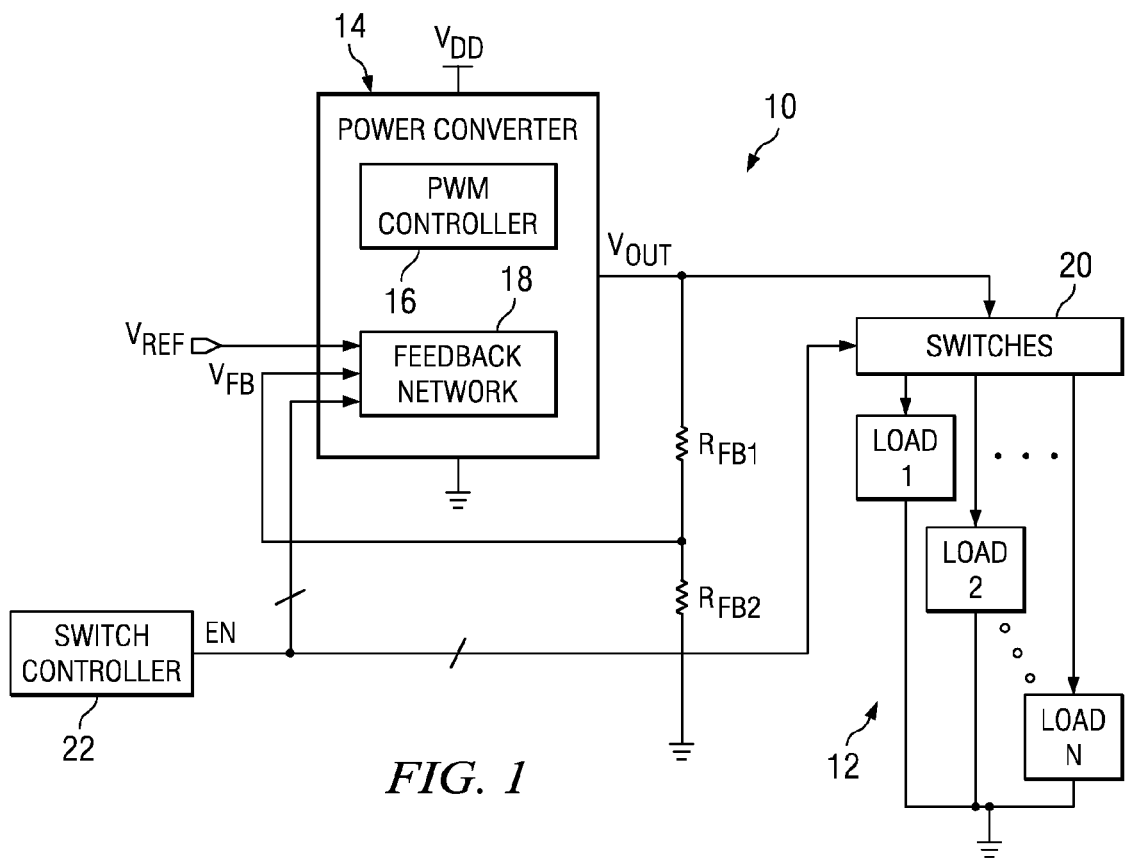
FIG. 1 illustrates an example of a power regulator system in accordance with an aspect of the invention.

FIG. 1 illustrates an example of a power regulator system 10 in accordance with an aspect of the invention. The power regulator system 10 can be implemented to regulate power associated with a plurality of output loads 12, demonstrated in the example of FIG. 1 as LOAD 1 through LOAD N, where N is a positive integer. The output loads 12 can be any of a variety of output loads. As an example, the output loads 12 can be series connected light-emitting diode (LED) strings configured to provide illumination for a backlight of a display on a portable electronic device, such as a laptop computer. The LED strings can be white LEDs (WLEDs), or can be colored LEDs, such as red, green, or blue LEDs.

The power regulator system 10 includes a power converter 14 configured to generate an output voltage $V_{OUT}$. The power converter 14 can be configured as a buck converter, a boost converter, or a buck/boost converter. As an example, the power converter 14 can be configured as a switched-mode power supply (SMPS), such that an inductor is alternately coupled between a positive supply voltage $V_{DD}$ and a negative supply voltage, demonstrated in the example of FIG. 1 as ground. The power converter 14 includes a PWM controller 16 configured to provide activation signals to switches (not shown) that couple the inductor to the positive supply voltage $V_{DD}$ and ground. As an example, the PWM controller 16 can provide a pulse-width modulation (PWM) signal to the switches based on a ramp signal and an error voltage, as explained in greater detail below. The output voltage $V_{OUT}$ is voltage divided via a pair of feedback resistors $R_{FB1}$ and $R_{FB2}$ to generate a scaled feedback voltage $V_{FB}$. The feedback voltage $V_{FB}$ and a reference voltage $V_{REF}$ are provided to a feedback network 18. The feedback network 18 is configured to provide the error voltage to the PWM controller 16 based on the output load conditions of the power converter 14.

The output voltage $V_{OUT}$ is also provided to a plurality of switches 20, with each switch corresponding to a given one of the output loads 12. The power regulator system 10 includes a switch controller 22 configured to generate a plurality of enable signals EN. The enable signals EN are provided to the switches 20 to sequentially activate the switches 20 couple the output voltage $V_{OUT}$ to each respective one of the output loads 12. As a result, each of the output loads 12 can individually receive the output voltage $V_{OUT}$ in a time-division multiplexed manner. However, each of the output loads 12 can draw separate amounts of current upon being switched to the output voltage $V_{OUT}$. A feedback capacitor, such as can be included in a sample and hold circuit of a typical power converter, can adjust to changes in the output load conditions. However, the feedback capacitor may have limited bandwidth, such that the feedback capacitor may only be able to gradually adjust to changes in the output load conditions. As a result, a rapid change in the output loading of the power converter 14, such as resulting from the output voltage $V_{OUT}$ being switched from one of the output loads 12 to another, can cause an output ripple condition, and thus an unstable output voltage $V_{OUT}$.

To substantially mitigate an output ripple condition, the feedback network 18 is configured to adjust the feedback voltage $V_{FB}$ based on which of the output loads 12 the output voltage $V_{OUT}$ is switched. In the example of FIG. 1, the feedback network 18 receives the plurality of enable signals EN, such that the adjustment of the feedback voltage $V_{FB}$ can be based on the plurality of enable signals EN. For example, the feedback network 18 can include an error amplifier and a set of switches that are each associated with a separate sample and hold circuit. The switches in the feedback network 18 can correspond to the switches 20, such that each of the plurality of enable signals EN can activate a respective switch in both the feedback network 18 and the switches 20. As a result, the feedback network 18 can sample and hold an error amplifier output voltage for a given one of the output loads 12, such as via a respective feedback capacitor, and provide the respective adjustment to the feedback voltage $V_{FB}$ substantially concurrently with the respective one of the output loads 12 being switched to the output voltage $V_{OUT}$. Therefore, the feedback network 18 can be automatically provided with the appropriate feedback voltage independent of the limited bandwidth capability of a feedback capacitor. Accordingly, the power converter 14 can substantially mitigate output ripple conditions by reacting substantially instantaneously to rapid output loading changes to provide a substantially stable output voltage $V_{OUT}$.

It is to be understood that the power regulator system 10 is not intended to be limited by the example of FIG. 1. For example, the discussion of the example of FIG. 1 pertaining to the operation of the power converter 14 has been simplified for the sake of brevity. Therefore, it is to be understood that the power regulator system 10 can include any of a variety of additional components not demonstrated in the example of FIG. 1. Furthermore, while it has been discussed that the output loads 12 can be LED strings, as an example, the power regulation system 10 can be implemented in any of a variety of applications that include switched output loading conditions. Therefore, the power regulator system 10 can be configured in any of a variety of ways.

Figure 2:
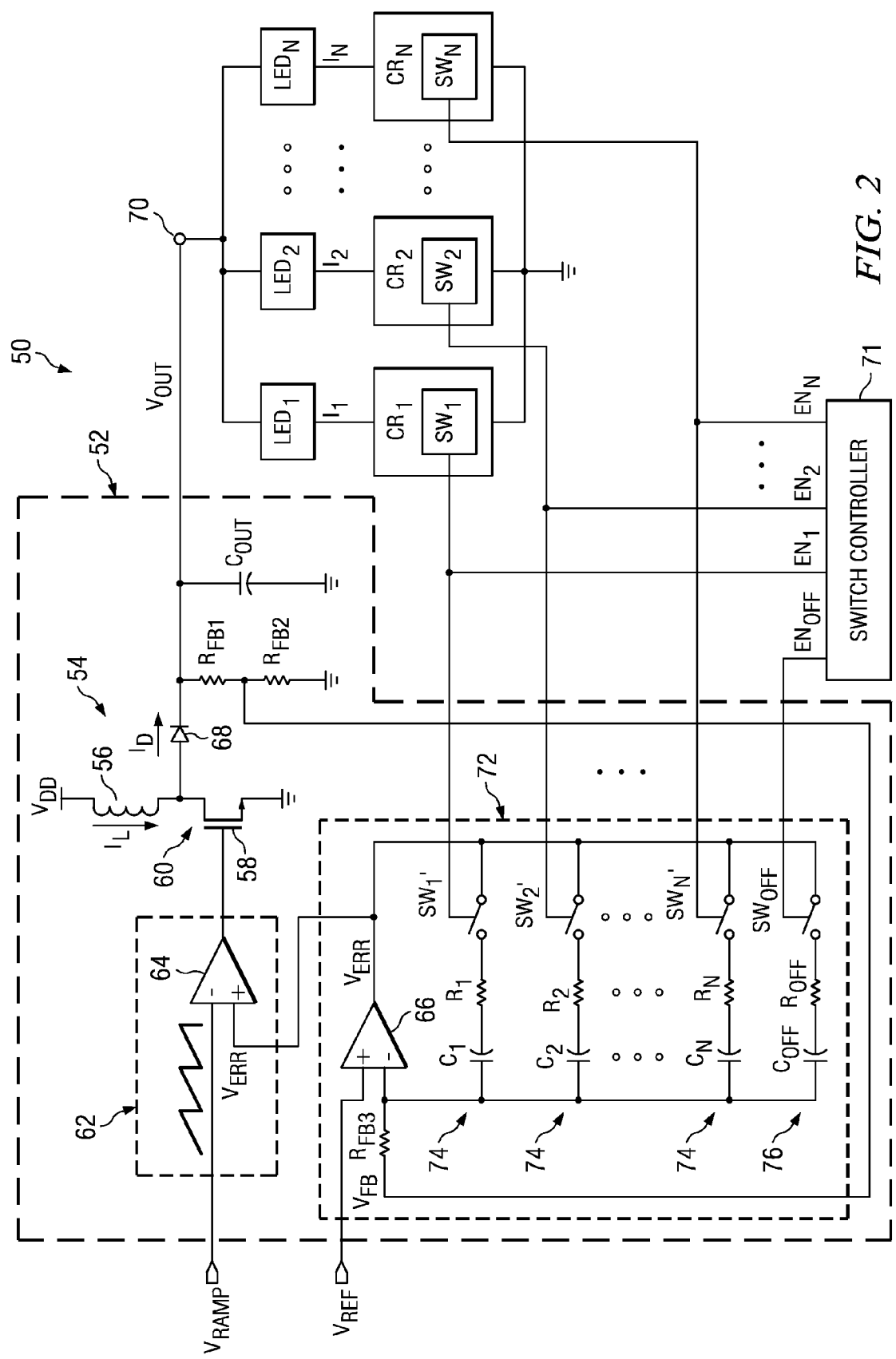
FIG. 2 illustrates another example of a power regulator system in accordance with an aspect of the invention.

FIG. 2 illustrates another example of a power regulator system 50 in accordance with an aspect of the invention. The power regulator system 50 can be implemented to regulate power associated with a plurality of series-connected LED strings $LED_1$ through $LED_N$. The LED strings can be WLEDs, can be colored LEDs, such as red, green, or blue LEDs, or can be a mixture of colors on different ones or the same LED strings. As an example, the power regulator system 50 can be implemented to control a brightness of a backlight in a portable electronic device.

The power regulator system 50 includes a power converter 52 that includes a switching circuit 54. In the example of FIG. 2, and as described herein, the switching circuit 54 is configured as a boost regulator that includes a high-side inductor 56 and a low-side switch 58 interconnected by a switching node 60. The high-side inductor 56 interconnects the switching node 60 and a positive supply voltage $V_{DD}$. The low-side switch 58 interconnects the switching node 60 and a negative supply voltage, demonstrated as ground in the example of FIG. 2. The low-side switch 58 is demonstrated in the example of FIG. 2 as an N-type field effect transistor (FET). However, it is to be understood that the low-side switch 58 is not limited to a FET in the switching circuit 54. It is also to be understood that the switching circuit 54 is not limited to the use of a single high-side inductor and single low-side switch, but can include any of a variety of combinations of switches and/or inductors.

The high-side inductor 56 provides a current IL to the switching node 60, and the low-side switch 58 receives activation signals from a switching controller 62. The switching controller 62 includes a PWM comparator 64 that is configured to provide activations signals to the low-side switch 58 based on a comparison of a ramp signal $V_{RAMP}$ and an error voltage $V_{ERR}$ generated by an error amplifier 66. The output of the PWM comparator 64 are thus PWM signals that can alternately activate and deactivate the low-side switch 58 to couple the switching node 60 to ground, thus generating the current flow $I_L$ through the high-side inductor 56. The switching node 60 is coupled to an output diode 68 that provides an output current $I_D$ to an output 70 of the switching power supply 52. The output current $I_D$ charges an output capacitor $C_{OUT}$ that is coupled to an output resistor $R_{OUT}$. In addition, the output voltage $V_{OUT}$ is voltage divided via a pair of feedback resistors $R_{FB1}$ and $R_{FB2}$ to generate a scaled feedback voltage $V_{FB}$, which is provided to the error amplifier 66 via a resistor $R_{FB3}$. Thus, the error amplifier 66 generates the error voltage $V_{ERR}$ based on a potential of the feedback voltage $V_{FB}$ relative to a reference voltage $V_{REF}$, which can be set to a desired voltage potential to which the output voltage $V_{OUT}$ is intended to achieve.

In the example of FIG. 2, the output voltage $V_{OUT}$ is provided to the plurality of LED strings $LED_1$ through $LED_N$, where N is a positive integer. The LED strings $LED_1$ through $LED_N$ are coupled to a respective plurality of current regulators $CR_1$ through $CR_N$. The current regulators $CR_1$ through $CR_N$ are configured to maintain a substantially constant supply current through each of the respective. In the example of FIG. 2, the supply current is demonstrated as separate respective current signals $I_1$ through $I_N$. The current regulators $CR_1$ through $CR_N$ can each be configured as a current sink to maintain the substantially constant supply currents $I_1$ through $I_N$. As an example, the current sinks can include current mirrors, or can include variable resistor current sources.

The power regulation system 50 includes a plurality of switches $SW_1$ through $SW_N$ that interconnect the current regulators $CR_1$ through $CR_N$ with the respective LED strings $LED_1$ through $LED_N$. In the example of FIG. 2, the switches $SW_1$ through $SW_N$ are demonstrated as part of the current regulators $CR_1$ through $CR_N$, such that the switches $SW_1$ through $SW_N$ can be part of the current regulators $CR_1$ through $CR_N$. Alternatively, it is to be understood that the switches $SW_1$ through $SW_N$ can be configured separately from the current regulators $CR_1$ through $CR_N$. The brightness of the LED strings $LED_1$ through $LED_N$ can be controlled based on a duration of activation of the switches $SW_1$ through $SW_N$. For example, the switches $SW_1$ through $SW_N$ can be activated for longer periods of time for brighter illumination of the LED strings $LED_1$ through $LED_N$. However, activating and deactivating the switches $SW_1$ through $SW_N$ substantially simultaneously can result in an unstable output voltage $V_{OUT}$, and thus a potential for an undesired output ripple. For example, the current draw of all the LED strings $LED_1$ through $LED_N$ can be excessive when all the switches $SW_1$ through $SW_N$ are activated, which can thus result in a possible overshoot condition of the output voltage $V_{OUT}$ when the switches $SW_1$ through $SW_N$ are deactivated.

Accordingly, the power regulator system 50 includes a switch controller 71 configured to generate a plurality of enable signals $EN_1$ through $EN_N$ configured to activate the respective switches $SW_1$ through $SW_N$. The enable signals $EN_1$ through $EN_N$ can be out-of-phase of each other and asserted (i.e., logic high) mutually exclusively of one another. As an example, the enable signals $EN_1$ through $EN_N$ can be cascaded, such that the switches $SW_1$ through $SW_N$ are sequentially activated to sequentially couple a given one of the LED strings $LED_1$ through $LED_N$ to the respective one of the current regulators $CR_1$ through $CR_N$ at a given time. Therefore, the brightness of the LED strings $LED_1$ through $LED_N$ can be controlled based on a pulse-width of the enable signals $EN_1$ through $EN_N$, with the activation of the switches SW1 through SWN being staggered to mitigate output ripple.

The power converter 52 also includes a feedback network 72 to which the enable signals $EN_1$ through $EN_N$ are also provided. The feedback network 72 includes the error amplifier 66 and a plurality of sample and hold circuits 74, with each of the sample and hold circuits 74 corresponding to the respective LED strings $LED_1$ through $LED_N$. Each of the sample and hold circuits 74 includes a switch, a feedback resistor, and a feedback capacitor, such that the feedback network 72 includes switches $SW_1'$ through $SW_N'$, feedback resistors $R_1$ through $R_N$, and feedback capacitors $C_1$ through $C_N$. The sample and hold circuits 74 are connected in parallel with respect to each other. In the example of FIG. 2, the sample and hold circuits 74 interconnect an inverting input of the error amplifier 66 and the error voltage $V_{ERR}$ at the output of the error amplifier 66. In addition, the feedback network 72 includes an off-state sample and hold circuit 76 that includes a switch $SW_{OFF}$, a feedback resistor $R_{OFF}$, and a feedback capacitor $C_{OFF}$. The switch $SW_{OFF}$ is activated by an enable signal $EN_{OFF}$.

The switches $SW_1'$ through $SW_N'$ are each activated in response to the respective enable signals $EN_1$ through $EN_N$. Therefore, the switches $SW_1$ and $SW_1'$ are both activated substantially concurrently upon the enable signal $EN_1$ being asserted, the switches $SW_2$ and $SW_2'$ are both activated substantially concurrently upon the enable signal $EN_2$ being asserted, and so forth. Therefore, upon the LED string $LED_1$ being switched to the output voltage $V_{OUT}$, the switch $SW_1'$ couples the feedback capacitor $C_1$ to the error amplifier 66. The feedback capacitor $C_1$ can thus sample and hold the error voltage $V_{ERR}$ output from the error amplifier 66 via the feedback resistor $R_1$. As a result, the feedback capacitor $C_1$ can store a charge that corresponds to the feedback information of the LED string $LED_1$. Thus, every time the LED string $LED_1$ is switched to the output voltage $V_{OUT}$, the feedback capacitor $C_1$ is switched to the error amplifier 66 to provide the appropriate feedback voltage $V_{FB}$ corresponding to the output load of the LED string $LED_1$.

The remaining sample and hold circuits 74 likewise sample and hold the error voltage $V_{ERR}$ corresponding to the respective LED strings $LED_2$ through $LED_N$ upon the LED strings $LED_2$ through $LED_N$ being switched to the output voltage $V_{OUT}$ via the respective current regulators $CR_2$ through $CR_N$. Accordingly, the error signal $V_{ERR}$ is automatically adjusted for the PWM comparator 64 to provide the appropriate switching activity to maintain a stable output voltage $V_{OUT}$, even upon a rapid transition in the output loading condition of the power converter 54. Furthermore, the sample and hold circuit 76 can be coupled to the error amplifier 66 during an off-state of the power regulator system 50 to sample and hold the error voltage $V_{ERR}$ during an off-state. For example, the power regulator system 50 can switch between an on-state, such that a given one of the plurality of LED strings $LED_1$ through $LED_N$ are coupled to the output voltage $V_{OUT}$ to provide an output load to the power converter 52, and an off-state, such that no load is coupled to the power converter 52. The power regulator system 50 can therefore be switched to an off-state at times in between activations of the switches $SW_1'$ through $SW_N'$, at respective times when none of the LED strings $LED_1$ through $LED_N$ are coupled to the output voltage $V_{OUT}$. As a result, the output voltage $V_{OUT}$ can remain substantially stable even in transitional times when no load is coupled to the power converter 54, such that voltage overshoot can be substantially minimized, as well.

Figure 3:
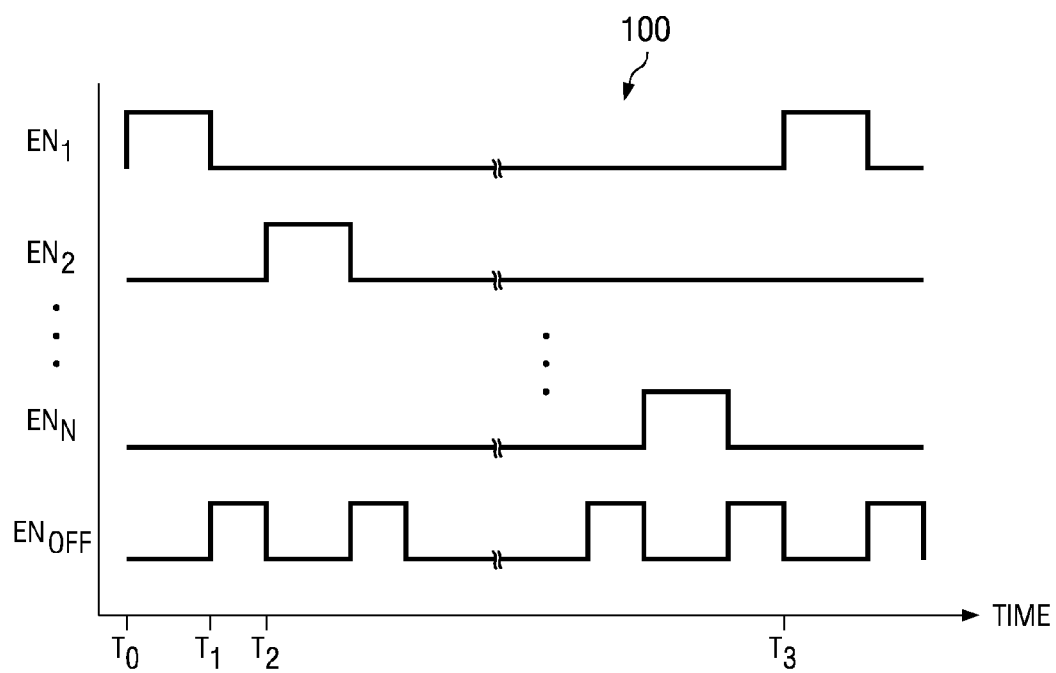
FIG. 3 illustrates an example of a timing diagram of the power regulator system of FIG. 2 in accordance with an aspect of the invention.

FIG. 3 illustrates an example of a timing diagram 100 of the power regulator system 50 of FIG. 2 in accordance with an aspect of the invention. The timing diagram 100 demonstrates the enable signals $EN_1$ through $EN_N$ over time. At a time T0, the enable signal $EN_1$ is asserted, thus activating the switch $SW_1$. Therefore, the LED string $LED_1$ becomes coupled to the output voltage $V_{OUT}$. At the same time, the switch $SW_1'$ is activated to couple the feedback capacitor $C_1$ to the error amplifier 66. Accordingly, the feedback capacitor $C_1$ samples and holds feedback information associated with the LED string $LED_1$, the feedback information being associated with the error voltage $V_{ERR}$ across the feedback resistor $R_1$. It is to be understood that, substantially concurrently, the feedback capacitor $C_1$ is also providing feedback information that may have been previously sampled to the error amplifier 66.

At a time $T_1$, the enable signal $EN_1$ is deasserted (i.e., logic low), thus deactivating the switches $SW_1$ and $SW_1'$. At the same time, the enable signal $EN_{OFF}$ is asserted to activate the switch $SW_{OFF}$, thus coupling the feedback capacitor $C_{OFF}$ to the error amplifier 66. Thus, the power regulator system 50 is switched to an off-state, such that the feedback capacitor $C_{OFF}$ likewise samples and holds the error voltage $V_{ERR}$ and provides the feedback voltage $V_{FB}$ to the error amplifier 66. At a time $T_2$, the enable signal $EN_{OFF}$ is deasserted and the enable signal $EN_2$ is asserted to activate the switches $SW_2$ and $SW_2'$. Therefore, between the time $T_1$ and the time $T_2$, none of the LED strings $LED_1$ through $LED_N$ are coupled to the output voltage $V_{OUT}$ via the respective current regulators $CR_1$ through $CR_N$. Therefore, the feedback capacitor $C_{OFF}$ samples and holds the error voltage $V_{ERR}$ corresponding to off-state feedback voltage information to the error amplifier 66. Accordingly, because there is no output load to draw current from the output voltage $V_{OUT}$, the switching controller 62 can reduce the high-side switching of the switching circuit 54 to maintain a stable output voltage $V_{OUT}$, despite the absence of an output load.

As described above, at the time $T_2$, the enable signal $EN_2$ is asserted, at which the power regulator system 50 switches from an off-state to an on-state. As such, the switches $SW_2$ and $SW_2'$ are activated to couple the LED string $LED_2$ to the output voltage $V_{OUT}$ and to couple the feedback capacitor $C_2$ to the error amplifier 66, similar to as described above. Therefore, the enable signals $EN_1$ through $EN_N$ are sequentially asserted between off-states to sequentially activate the respective switches $SW_1$ through $SW_N$ and $SW_1$ through $SW_N'$ to provide the respective feedback voltages $V_{FB}$ associated with the respective LED strings $LED_1$ through $LED_N$. At a time $T_3$, the enable signal $EN_1$ is asserted again to repeat the sequential assertion of the enable signals $EN_1$ through $EN_N$. In addition, between the on-state assertions of each of the enable signals $EN_1$ through $EN_N$, the enable signal $EN_{OFF}$ is asserted to provide the off-state feedback voltage $V_{FB}$ to provide a smooth transition of the output voltage $V_{OUT}$ between load transitions of the LED strings $LED_1$ through $LED_N$. Accordingly, the output voltage $V_{OUT}$ is maintained as a stable output voltage potential, such that output ripple is substantially mitigated.

It is to be understood that the power regulator system 50 is not intended to be limited by the example of FIGS. 2 and 3. For example, as described above, the brightness of the LED strings $LED_1$ through $LED_N$ can be controlled based on a pulse-width of the enable signals $EN_1$ through $EN_N$. Therefore, to maximize the brightness capability of the LED strings $LED_1$ through $LED_N$, the enable signals $EN_1$ through $EN_N$ may be sequentially asserted without an off-state enable signal $EN_{OFF}$, such that the enable signals $EN_1$ through $EN_N$ are immediately sequentially asserted without the interposing off-states. Accordingly, the off-state sample and hold circuit 76 may not be included in the power regulator system 50, or may be deactivated upon the enable signals $EN_1$ through $EN_N$ being immediately sequentially asserted to maximize brightness of the LED strings $LED_1$ through $LED_N$.

In addition, although the example of FIG. 2 demonstrates the power regulator system 50 being configured as an SMPS, it is to be understood that the power regulator system 50 can include any of a variety of other types of power converters. As another example, it is to be understood that the feedback network 72 is not limited to being configured with the error amplifier 66, and the sample and hold circuits 74 and 76 are not limited to being configured as feedback loops between the error voltage $V_{ERR}$ and the inverting input of the error amplifier 66. Instead, as an example, the feedback network 72 can be configured to include a transconductance amplifier (i.e., gm amplifier), such that the sample and hold circuits 74 and 76 can instead interconnect the error voltage $V_{ERR}$ and ground. In addition, it is to be understood that the current regulators $CR_1$ through $CR_N$ in the example of FIG. 2 are not limited to being configured as current sinks, but could instead be configured as current sources. Furthermore, the power regulator system 50 is not limited to regulating the output voltage $V_{OUT}$ to the LED strings $LED_1$ through $LED_N$, but can be implemented in any of a variety of applications that include switched output loading conditions. Therefore, the power regulator system 50 can be configured in any of a variety of ways.

In view of the foregoing structural and functional features described above, certain methods will be better appreciated with reference to FIG. 3. It is to be understood and appreciated that the illustrated actions, in other embodiments, may occur in different orders and/or concurrently with other actions. Moreover, not all illustrated features may be required to implement a method.

Figure 4:
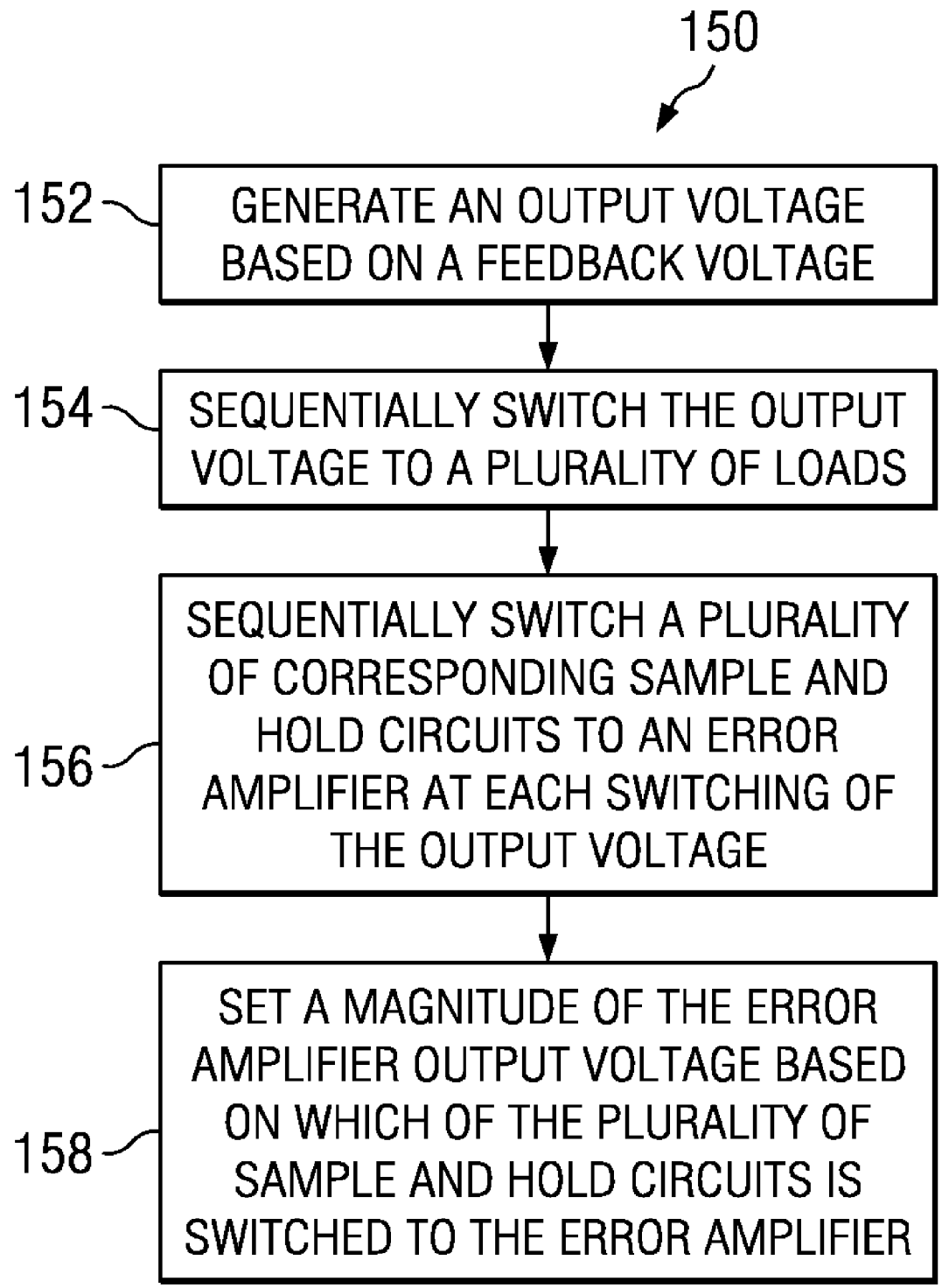
FIG. 4 illustrates an example of a method for regulating an output voltage in accordance with an aspect of the invention.

FIG. 4 illustrates an example of a method 150 for regulating an output voltage in accordance with an aspect of the invention. At 152, an output voltage is generated based on a feedback voltage. The output voltage can be generated from the switching activity of an SMPS, such as a buck converter, boost converter, or a buck/boost converter. The activation of signals can be based on PWM signals generated from a PWM switching circuit. At 154, the output voltage is sequentially switched between a plurality of output loads. The sequential activation can be based on a respective plurality of enable signals. The switching of the output voltage to an output load corresponds to an on-state of the power converter. The plurality of output loads can be configured as current regulator and LED string pairs. Therefore, the brightness of the LED strings can be based on a pulse-width of the enable signals.

At 156, a plurality of corresponding sample and hold circuits are sequentially switched to an error amplifier at each switching of the output voltage. The sample and hold circuits can each include a feedback capacitor that is configured to sample an error amplifier output voltage upon the respective output load being switched to the output voltage. The sample and hold circuits can be switched based on a respective plurality of switches that are likewise controlled by the enable signals. At 158, a magnitude of the error amplifier output voltage is set based on which of the sample and hold circuits are switched to the error amplifier. The feedback voltage can be set by adjusting the feedback voltage based on the sampled error amplifier output voltage information that is stored in the respective feedback capacitor, such that the error amplifier output voltage information corresponds to the appropriate output load that is switched to the output voltage. In addition, the power converter can be switched to an off-state between switching the output voltage to each of the output loads, such that no output load is coupled to the output voltage. Therefore, off-state feedback information can be provided to the error amplifier during the off-state between each output load being switched to the output voltage. Therefore, the output voltage is provided at a substantially stable potential, such that output ripple is substantially mitigated.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the invention is intended to embrace all such alterations, modifications, and variations that fall within the spirit and scope of the appended claims.

What is claimed is:

1. A system for regulating an output voltage of a power converter, the system comprising:

a single power converter coupled to and providing power at the output voltage to a plurality of output loads;

an error amplifier that compares a feedback voltage associated with the output voltage with a reference voltage to generate an error signal that is employed to control a magnitude of the output voltage;

a plurality of sample and hold circuits each configured to sample an error amplifier output voltage to provide the error signal from a different one of the output loads; and a switching controller configured to control switching of the error amplifier output voltage between each of the plurality of sample and hold circuits in response to a change in an output load of the power converter, wherein the switching controller is further configured to control switching of the output voltage between each of the plurality of output loads concurrently with the switching of the error amplifier output voltage between each of the plurality of sample and hold circuits that corresponds to the respective output load.

2. The system of claim 1, wherein the switching controller sequentially switches the output voltage between the plurality of output loads based on a predetermined sequence.

3. The system of claim 2, wherein the switching controller concurrently disconnects the output voltage from a given load and an associated sample and hold circuit and connects a subsequent load to the output voltage and a subsequent sample and hold circuit to the error amplifier.

4. The system of claim 1, wherein the plurality of output loads comprise a plurality of series-connected LED strings and associated current regulators.

5. The system of claim 4, wherein the brightness of each of the plurality of series-connected LED strings is controlled based on a pulse-width of a respective enable signal output from the switching controller to switch the output voltage to a respective series-connected LED string.

6. The system of claim 1, wherein the plurality of sample and hold circuits comprises an off-state sample and hold circuit configured to sample the error amplifier output voltage and to provide the error amplifier output voltage to the input of the error amplifier in response to the output load being disconnected from the power converter.

7. The system of claim 1, wherein each of the plurality of sample and hold circuits comprises a switch and a feedback capacitor, the feedback capacitor being configured to sample the error amplifier output voltage and provide the error amplifier output voltage to the input of the error amplifier upon the switch being activated.

8. A portable electronic device comprising the system of claim 1.

9. A method for regulating power to a plurality of output loads, the method comprising:

generating an output voltage from a single power converter coupled to and providing power at the output voltage to a plurality of output loads based on a feedback voltage associated with an error amplifier;

sequentially switching the output voltage between each of the plurality of output loads; and sequentially switching an error amplifier output voltage between a plurality of corresponding sample and hold circuits, each sampling an error voltage associated with one of the plurality of output loads, concurrently with each switching of the output voltage, wherein the output voltage for each of the plurality of output loads is based on the sampled error voltage for that respective output load.

10. The method of claim 9, wherein switching between the plurality of sample and hold circuits comprises switching between a plurality of feedback capacitors each configured to sample and provide the error amplifier output voltage to an input of the error amplifier.

11. The method of claim 10, wherein the sequentially switching the output voltage and the sequentially switching the error amplifier output voltage is in response to enabling of associated enable signals.

12. The method of claim 11, wherein the plurality of output loads comprise a plurality of series-connected LED strings and associated current regulators, the method further comprising setting a brightness of the plurality of LED strings based on a pulse-width of the associated enable signals.

13. The method of claim 9, wherein sequentially switching between the respective plurality of sample and hold circuits comprises switching to an off-state sample and hold circuit when an output load is not connected to the output voltage.

14. The method of claim 9, wherein sequentially switching the error amplifier output voltage between the respective plurality of sample and hold circuits comprises:

sampling and providing the error amplifier output voltage associated with a respective one of the plurality of output loads to an input of the error amplifier associated with the feedback voltage;

comparing the feedback voltage with a reference voltage to generate the error amplifier output voltage; and controlling a magnitude of the output voltage based on the error amplifier output voltage.

15. A system for regulating an output voltage of a power converter, the system comprising:

single power converter means for generating an output voltage coupled to and providing power to a plurality of output loads at the output voltage;

means for adjusting the output voltage based on an error voltage;

means for switching between an on-state that provides the output voltage to one off the plurality of output loads and an off-state that disconnects the output voltage from the output loads;

a first means for sampling and providing the error voltage to the means for adjusting during the on-state, the first sampling means providing a separate error voltage corresponding to each respective one of the plurality of output loads; and a second means for sampling and providing the error voltage to the means for adjusting during the off-state, the second sampling means providing a separate error voltage from the error voltage provided by the first sampling means, whereby the output voltage is separately controlled during the off state.

16. The system of claim 15, wherein the means for switching further comprises sequentially switching the output voltage between a plurality of output loads in a predetermined sequence.

17. The system of claim 15, wherein the output load comprises a plurality of series-connected LED strings and associated current regulators, wherein a pulse-width of enable signals configured to control the means for switching between the on-state and the off-state and the means for sequentially switching between the plurality of means for sampling controls the brightness of the series-connected LED strings.

\* \* \* \* \*